(12) United States Patent
Nakagawa

(10) Patent No.: US 8,023,372 B2
(45) Date of Patent: Sep. 20, 2011

(54) ADDRESS DETECTION CIRCUIT AND ADDRESS DETECTION METHOD

(75) Inventor: Takashi Nakagawa, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 219 days.

(21) Appl. No.: 12/461,468

(22) Filed: Aug. 12, 2009

(65) Prior Publication Data

US 2010/0067341 A1    Mar. 18, 2010

(30) Foreign Application Priority Data

Sep. 18, 2008 (JP) ................................. 2008-239683

(51) Int. Cl.
*G11B 7/00* (2006.01)
(52) U.S. Cl. ................ 369/47.28; 369/47.15; 369/47.48
(58) Field of Classification Search ............... 369/44.13, 369/275.3, 47.27, 47.28, 47.1, 59.13, 47.48, 369/47.15, 53.34
See application file for complete search history.

(56) References Cited

U.S. PATENT DOCUMENTS

| 6,906,990 B2 | 6/2005 | Nagata et al. |
| 2010/0157753 A1* | 6/2010 | Iwanaga ..................... 369/47.15 |

FOREIGN PATENT DOCUMENTS

| JP | 2002-329329 | 11/2002 |
| JP | 2003-85749 | 3/2003 |
| JP | 2005-50469 | 2/2005 |

* cited by examiner

*Primary Examiner* — Nabil Z Hindi
(74) *Attorney, Agent, or Firm* — McGinn IP Law Group, PLLC

(57) ABSTRACT

An address detection circuit includes a correction signal generator that generates a plurality of timing correction signals based on an ADIP (Address In Pre-groove) signal that is read out from a wobble of an optical disk, the timing correction signals having different cycles with each other, a correction signal selector that selects one of the timing correction signals generated by the correction signal generator and outputs the selected signal, and a timing corrector that outputs a data address detected based on a data signal that is read out from a data track of the optical disk at a timing in accordance with the timing correction signal transmitted from the correction signal selector.

11 Claims, 14 Drawing Sheets

ADDRESS DETECTION CIRCUIT AND ADDRESS DETECTION METHOD

BACKGROUND

1. Field of the Invention

The present invention relates to an address detection circuit and an address detection method.

2. Description of Related Art

In order to execute reading and writing of data on an optical disk with high accuracy, it is required to detect a position on the optical disk with high accuracy. To detect the position on the optical disk, address information that indicates the position on the optical disk needs to be read out from the optical disk itself.

A method of storing the address information in the optical disk includes (1) a method of modulating wobbles meandering along with a data track, and (2) a method of writing address information on a data track. The position on the optical disk can be detected by reading out the address information stored in the optical disk.

In the optical disk, a spiral data track is formed beforehand. The data track is formed by the extension of convex and concave parts formed in the optical disk. More specifically, the data track is formed on a bottom surface of the concave part and/or an upper surface of the convex part. The wobbles are formed by modulating edges of the convex part along with an extending direction of the convex part.

Japanese Unexamined Patent Application Publication No. 2005-50469 (hereinafter referred to as patent document 1), Japanese Unexamined Patent Application Publication No. 2003-85749 (hereinafter referred to as patent document 2), and Japanese Unexamined Patent Application Publication No. 2002-329329 (hereinafter referred to as patent document 3) each discloses a technique of obtaining an address from an optical disk.

The patent document 1 discloses an address detection method which prevents an interruption of a processing caused by an error such as offtrack when a synchronized state of an address becomes unstable due to a state of recording data. The patent document 2 discloses a technique of providing a reproducing apparatus with high reliability of address information of an ADIP. The patent document 3 discloses a technique for reliably detecting a synchronization mark even when user data is recorded in a recording region through a random shift and for reliably reproducing the user data in accordance with the detected synchronization mark.

By the way, in order to detect the address information that indicates the position on the optical disk in a short time, the address may be detected from a signal that is read out from the data written in the data track (hereinafter referred to as data signal). However, data stored in the data track may be stored in a position that is widely apart from a basis position that indicates recording start/end positions or the like of the data that is set in advance in the optical disk. When the address is detected based on such a data, the recording data may be rewritten in a position that is widely apart from the basis position unless any correction processing is carried out. If the data is repeatedly rewritten under such condition, there may be occurred a phenomenon such as gap or overwriting of the recorded data, which may deteriorate the recording quality in the optical disk.

This problem may be addressed by correcting a timing of acquiring the address. However, as the deviation amount of the data with respect to the basis position is uncertain, it may not be possible to deal with the deviation of the data even when the address is detected with an offset by a certain period.

Note that, it may be achieved to suppress degradation of the recording quality of the optical disk by detecting the address from the ADIP (Address In Pre-groove) signal which is read-out from a wobble formed in the optical disk, because the timing can be obtained in accordance with the aforementioned basis position. However, in this case, relatively long time is required to detect the address information. As a result, detection of the position on the optical disk in a short time may be inhibited.

SUMMARY

The present inventors have found a problem that it is difficult to present admissibility for deviation of data against the basis position while realizing address detection in a short period of time.

A first exemplary aspect of an embodiment of the present invention is an address detection circuit including a correction signal generator that generates a plurality of timing correction signals based on an ADIP (Address In Pre-groove) signal that is read out from a wobble of an optical disk, the timing correction signals having different cycles with each other, a correction signal selector that selects one of the timing correction signals generated by the correction signal generator and outputs the selected signal, and a timing corrector that outputs a data address detected based on a data signal that is read out from a data track of the optical disk at a timing in accordance with the timing correction signal transmitted from the correction signal selector.

According to the address detection circuit, an output timing of a data address can be adjusted by any of the plurality of timing correction signals each having different cycles generated based on the ADIP signal. Accordingly, it is possible to present admissibility for the deviation of data against the basis position while realizing address acquiring in a short time.

A second exemplary aspect of an embodiment of the present invention is an address detection method that detects an address indicating a position on an optical disk, the method including generating a plurality of timing correction signals based on an ADIP (Address In Pre-groove) signal that is read out from a wobble of the optical disk, the timing correction signals having different cycles with each other, selecting one of the plurality of generated timing correction signals, and outputting a data address detected based on a data signal that is read out from a data track of the optical disk at a timing in accordance with the selected timing correction signal.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Figure 1A:
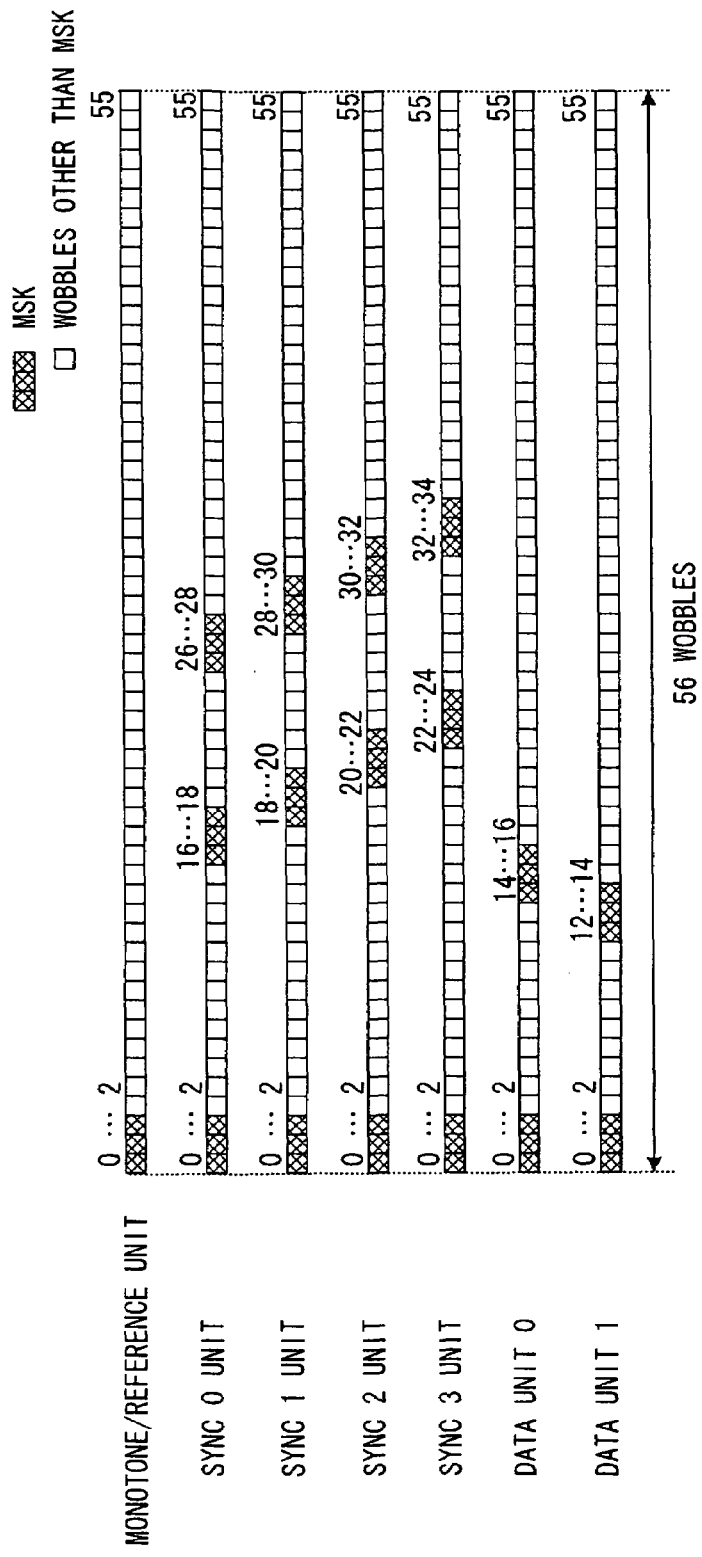
FIGS. 1A and 1B are explanatory diagrams regarding an ADIP format according to a first exemplary embodiment of the present invention.
Figure 1B:
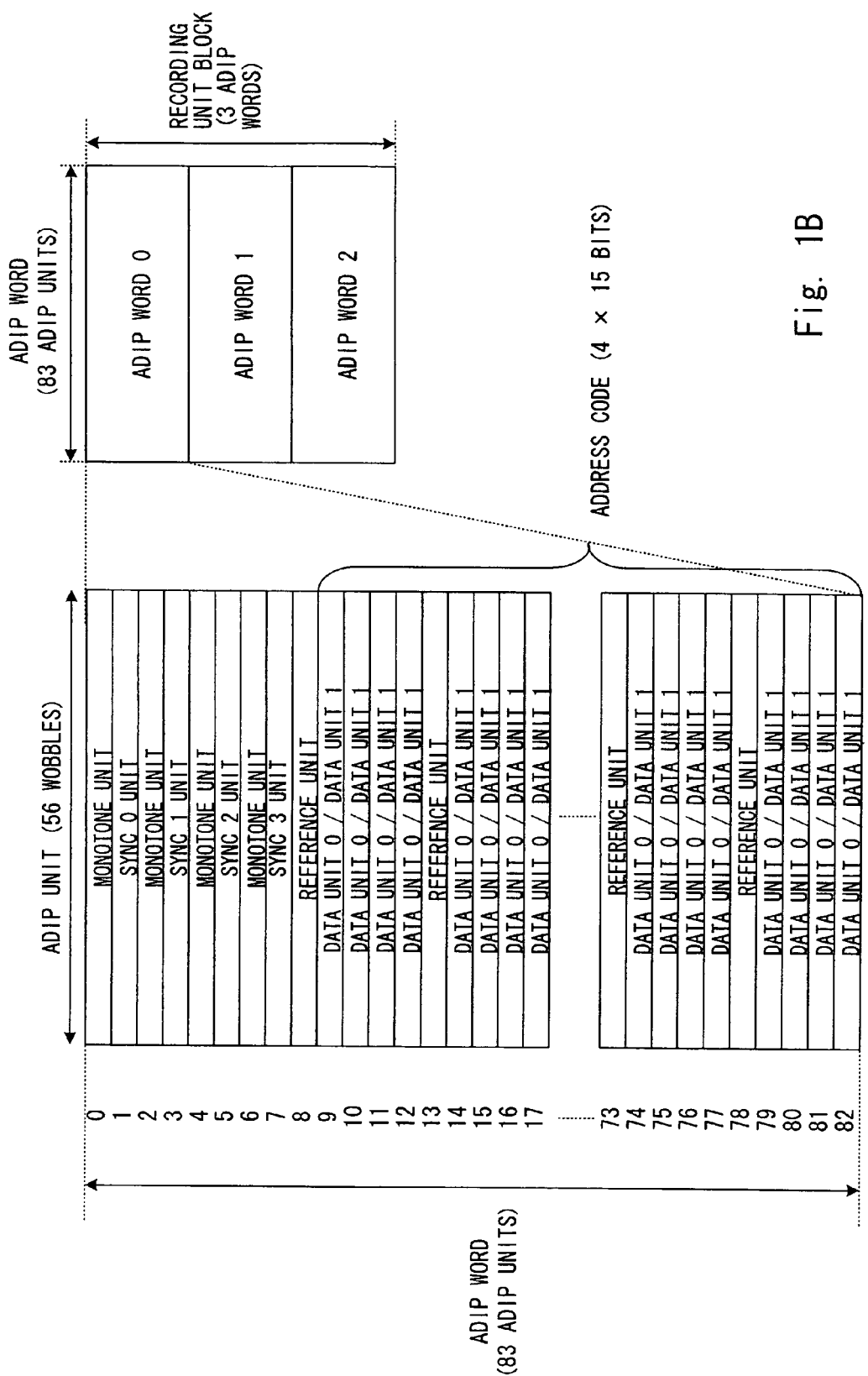
Figure 2:
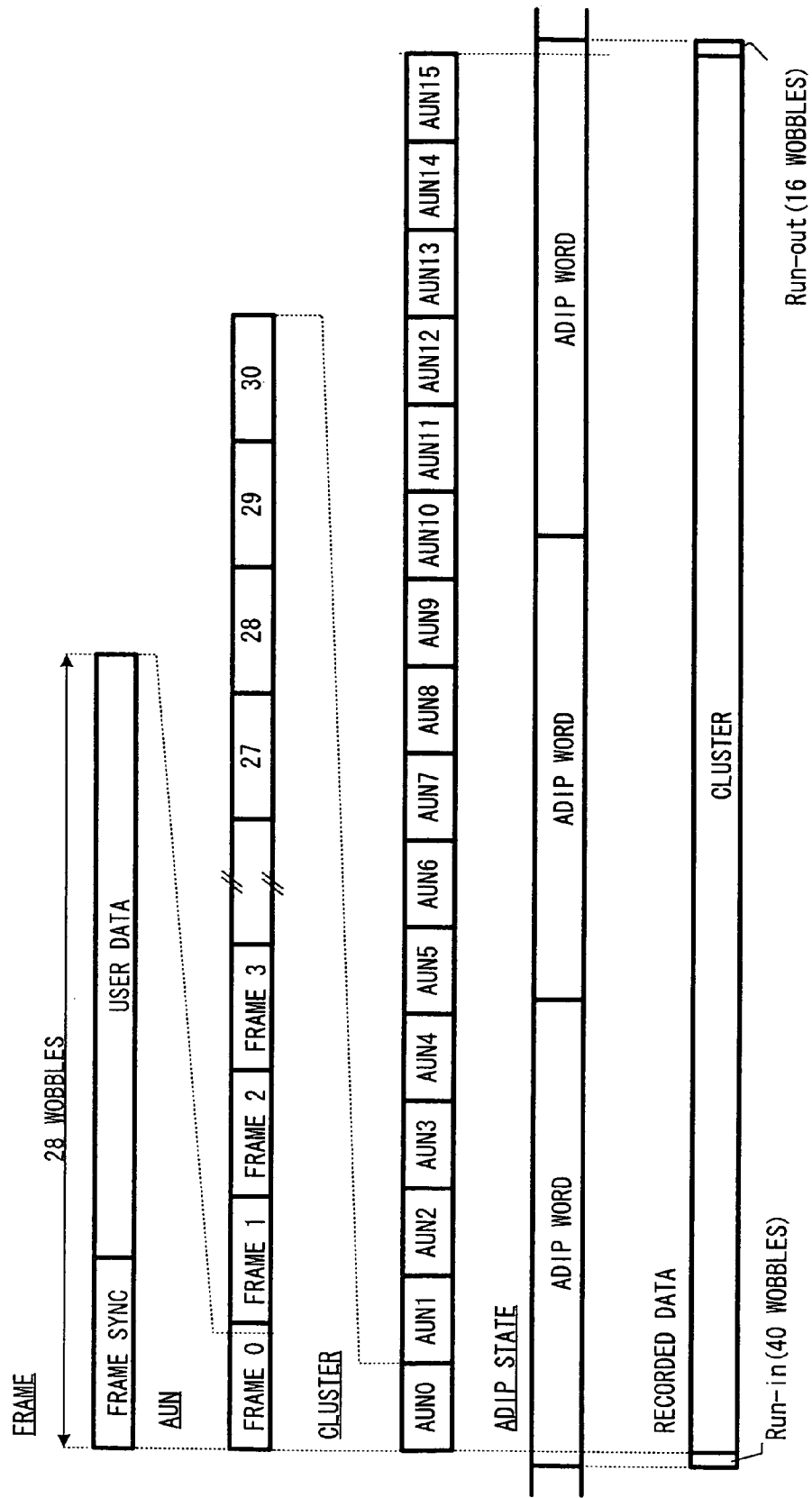
FIG. 2 is an explanatory diagram regarding a data format according to the first exemplary embodiment of the present invention.
Figure 3:
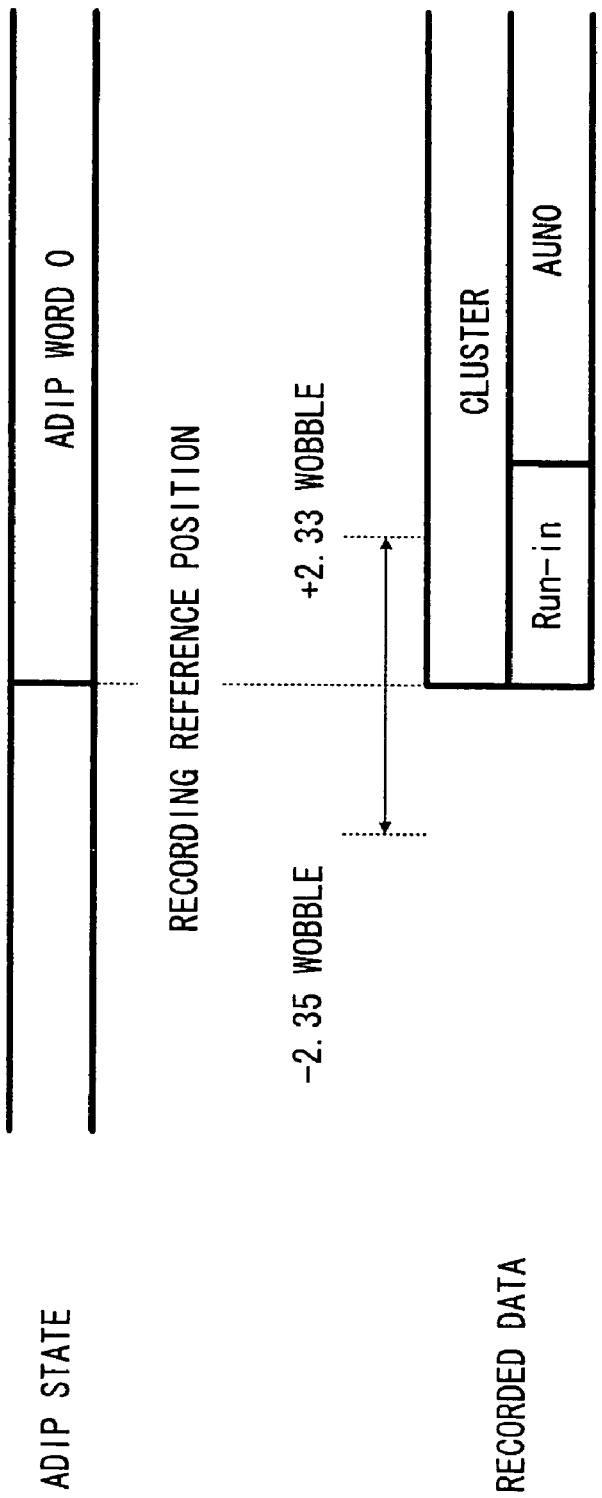
FIG. 3 is an explanatory diagram regarding a random shift according to the first exemplary embodiment of the present invention.
Figure 4:
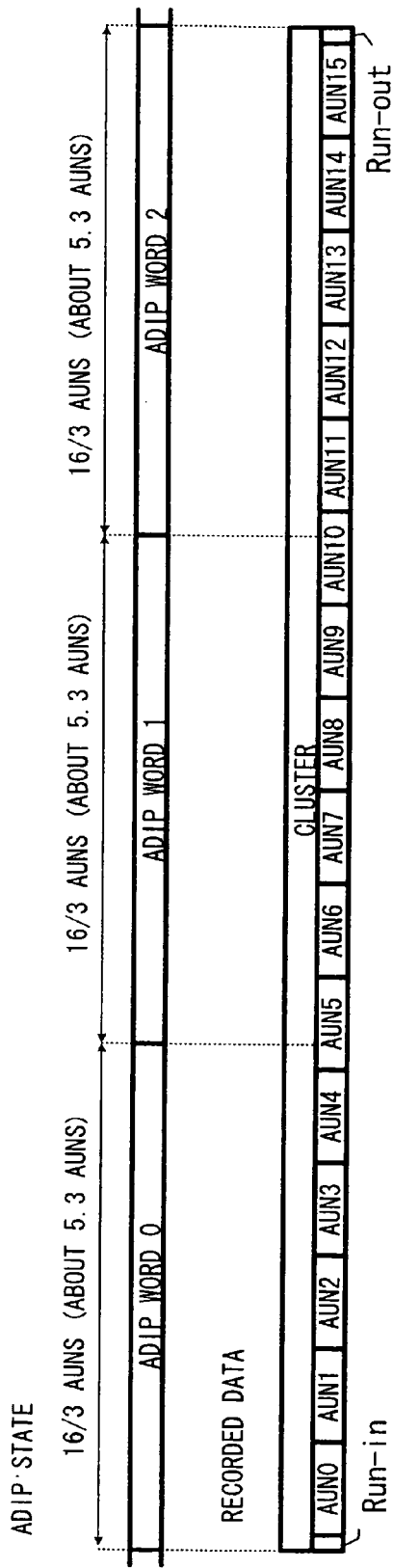
FIG. 4 is an explanatory diagram showing relations between ADIP words and AUNs according to the first exemplary embodiment of the present invention.
Figure 5:
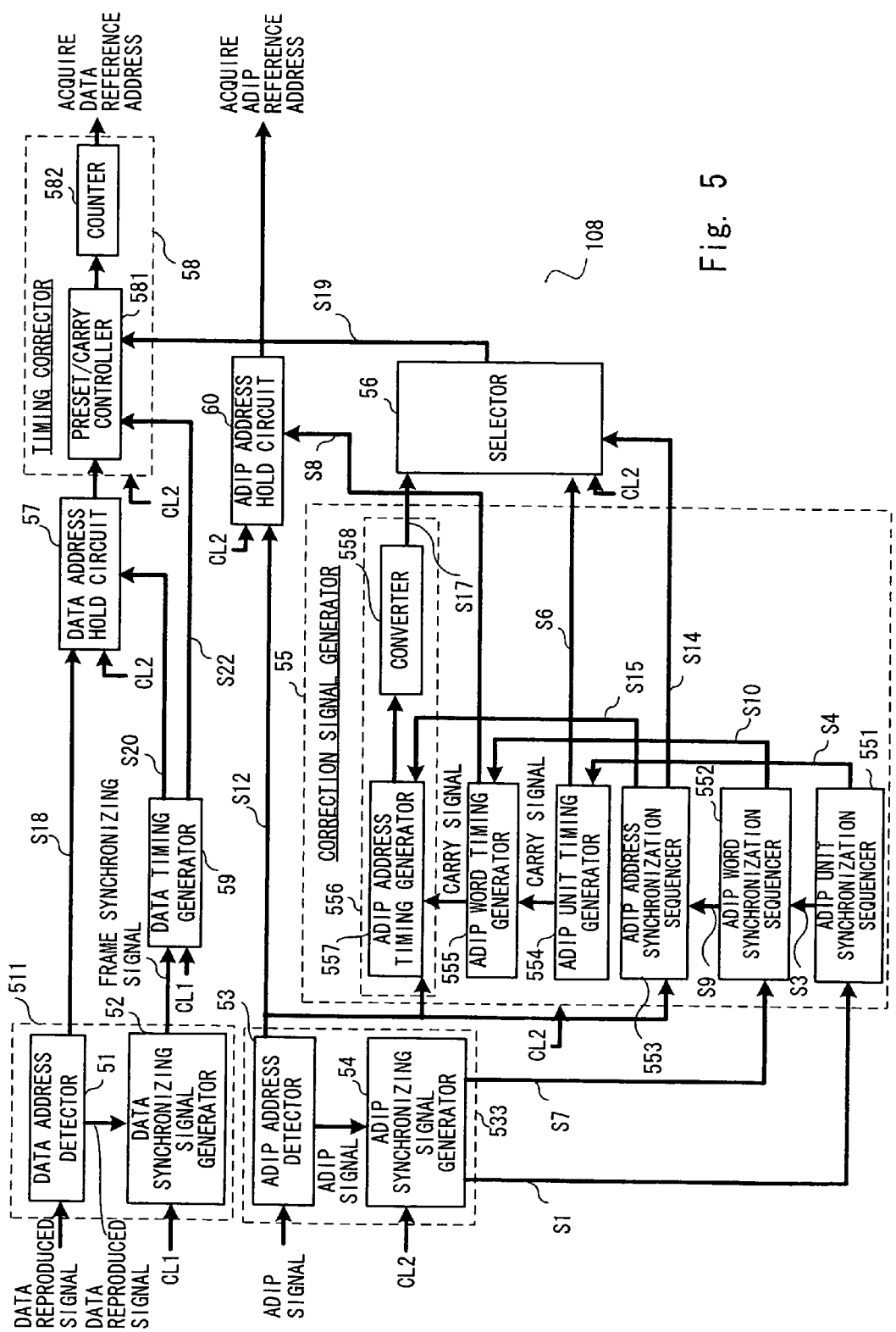
FIG. 5 is a schematic block diagram of an address detection circuit according to the first exemplary embodiment of the present invention.
Figure 6:
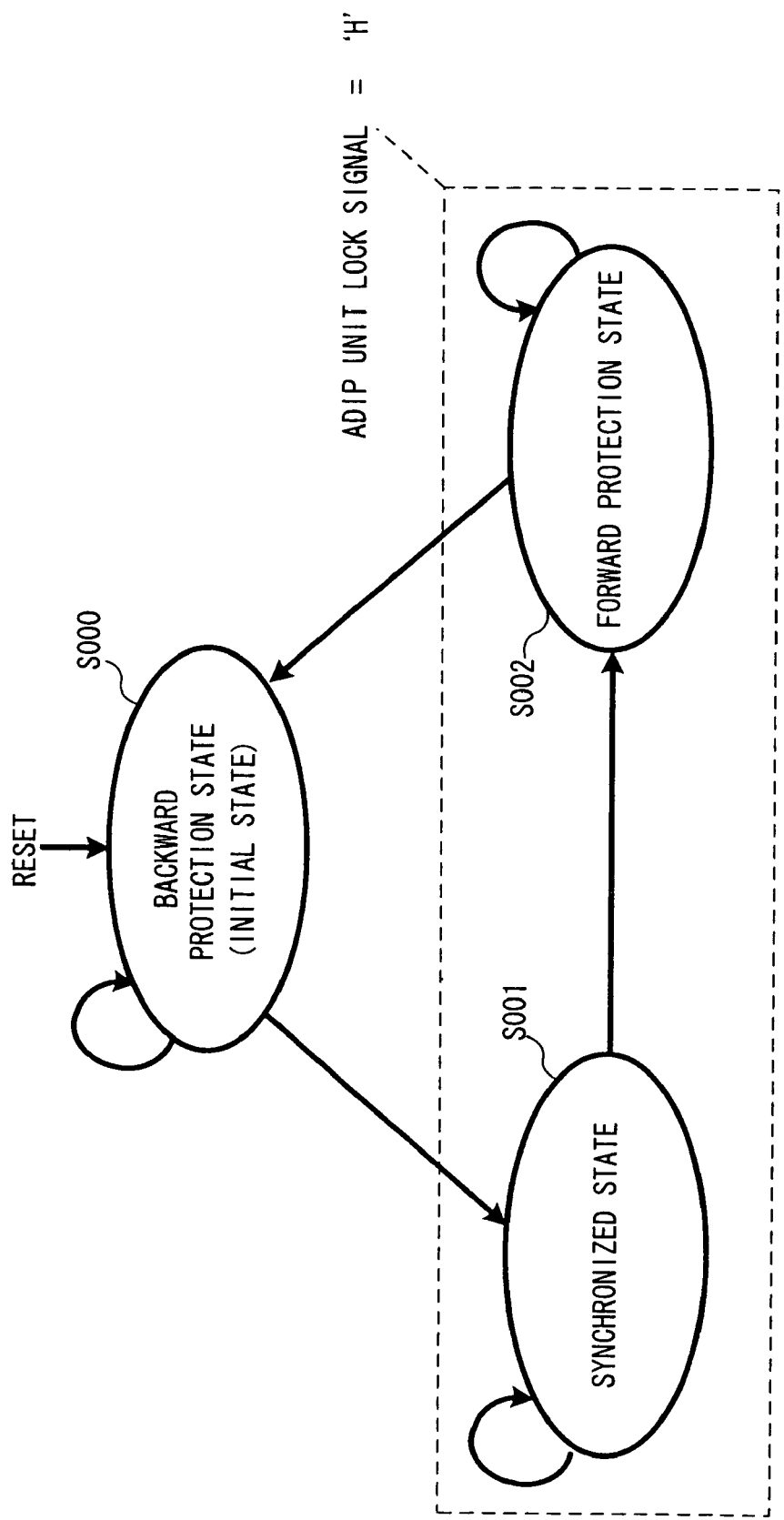
FIG. 6 is an explanatory diagram showing an operational state of a sequencer according to the first exemplary embodiment of the present invention.
Figure 7:
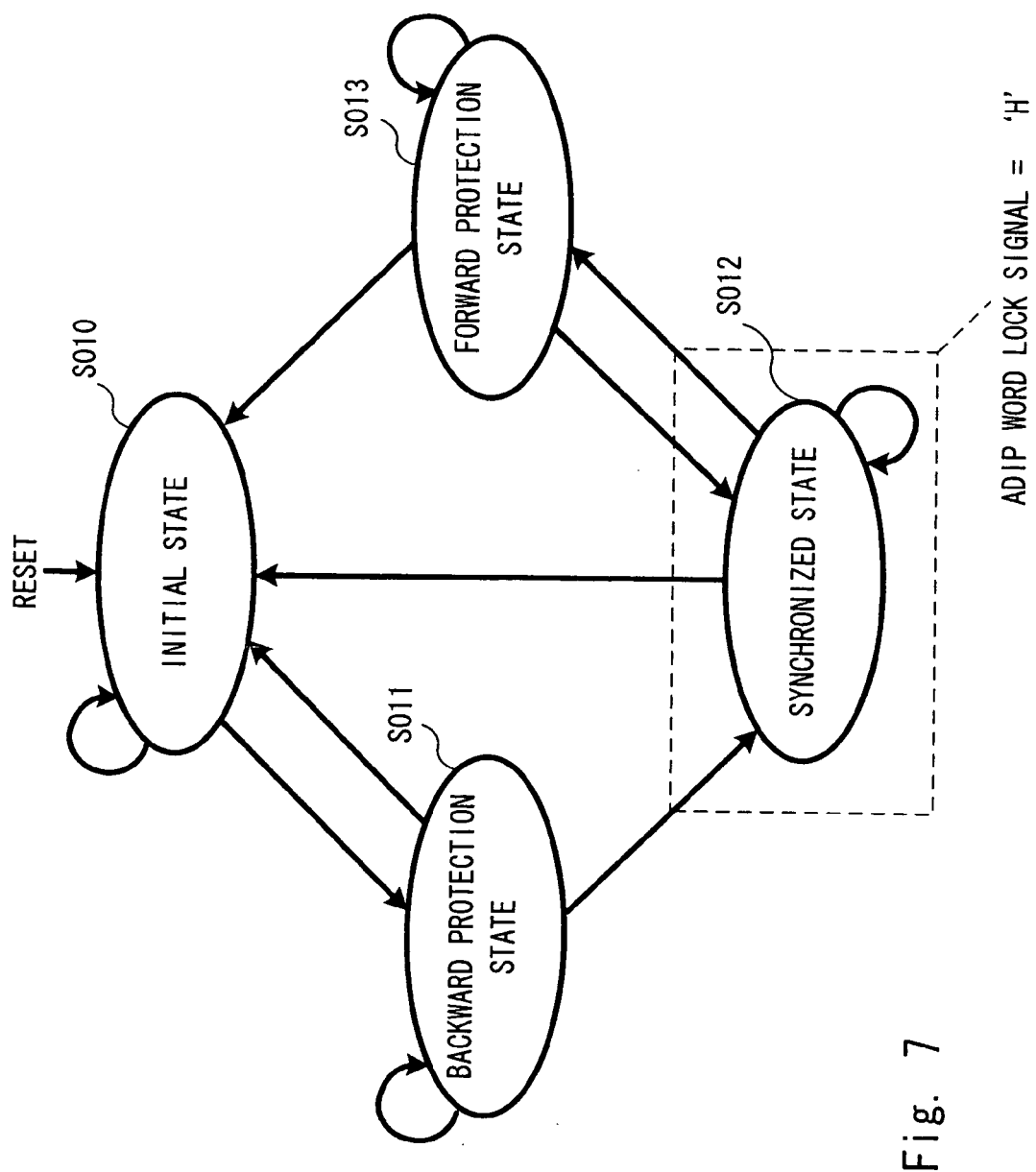
FIG. 7 is an explanatory diagram showing an operational state of a sequencer according to the first exemplary embodiment of the present invention.
Figure 8:
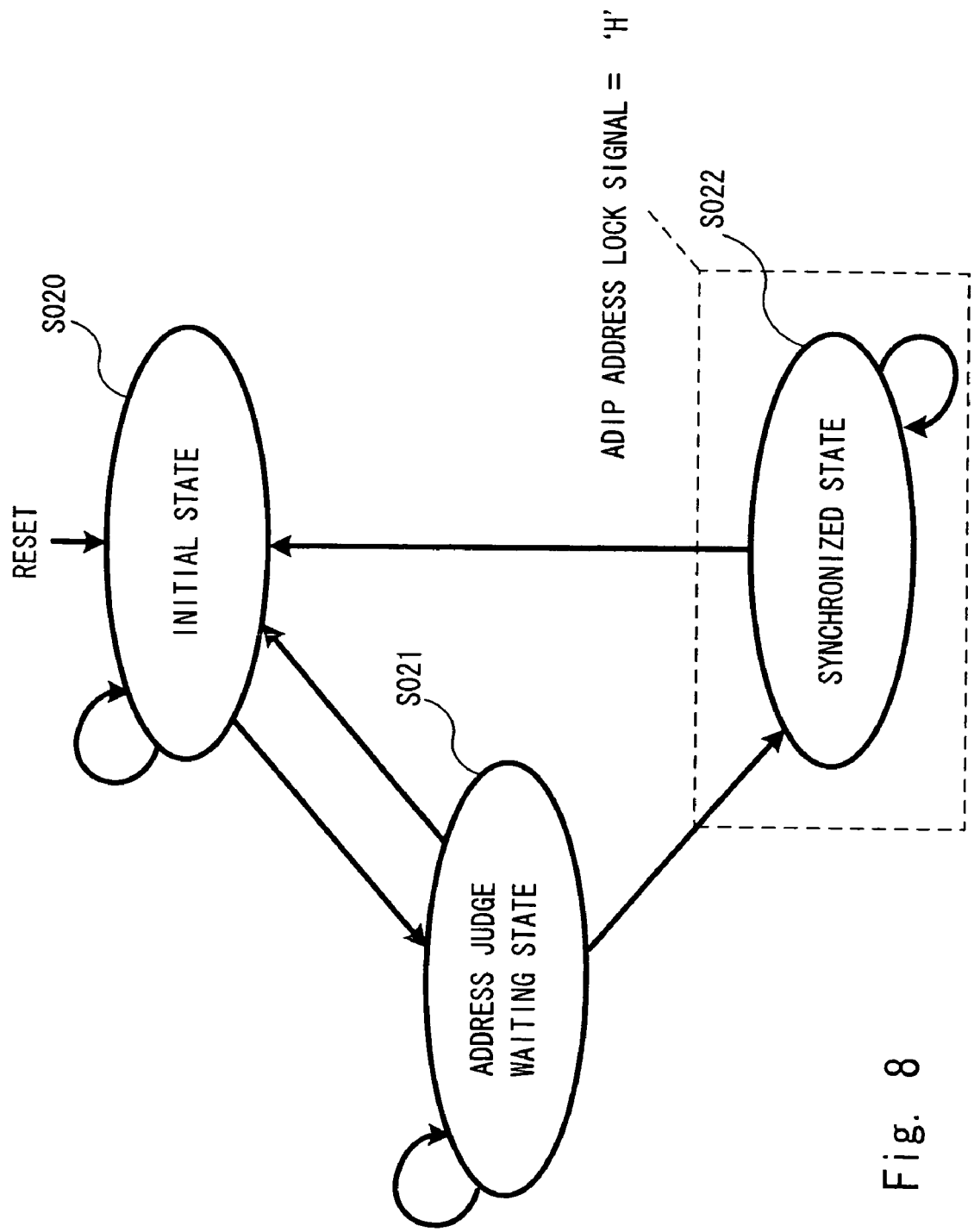
FIG. 8 is an explanatory diagram showing an operational state of a sequencer according to the first exemplary embodiment of the present invention.

Hereinafter, the first exemplary embodiment of the present invention will be described with reference to FIGS. 1A to 13. FIGS. 1A and 1B are explanatory diagrams regarding an ADIP format. FIG. 2 is an explanatory diagram regarding a data format. FIG. 3 is an explanatory diagram regarding a random shift. FIG. 4 is an explanatory diagram showing relations between ADIP words and AUNs. FIG. 5 is a schematic block diagram of an address detection circuit. FIGS. 6 to 8 are explanatory diagrams each showing an operational state of a sequencer. FIGS. 9 to 12 are timing charts each describing the operation of the address detection circuit. FIG. 13 is a block diagram showing the schematic configuration of an optical pickup device.

Referring first to FIGS. 1 to 4, an ADIP format and a data format in a BD (Blu-ray Disk) will be described. Address information stored in an optical disk by a wobble modulation system may be simply referred to as ADIP (Address In Pregroove). Further, in a BD-R/RE, an MSK (Minimum Shift Keying) system is employed as the wobble modulation system. In the MSK system, variation of a signal waveform between "0" and "1" is large, whereby address bits may be detected with relatively high accuracy.

Referring to FIGS. 1A and 1B, the ADIP format will be described. In the ADIP format, three kinds of units as an ADIP unit, an ADIP word, and an RUB (Recording Unit Block) are specified.

The ADIP unit is a unit to establish synchronization. An MSK (Minimum Shift Keying) arranged at the top of the ADIP unit represents a synchronizing signal. The ADIP unit is composed of 56 wobbles. One wobble corresponds to 69 T (where T represents a channel clock which is a recording minimum unit).

The ADIP unit is divided into data units 0/1, and sync 0/1/2/3 units. The data units 0/1 indicate bit values 0/1 of an address according to a position of the middle MSK. The sync 0/1/2/3 units indicate a synchronizing signal of an ADIP word that will be described later.

The ADIP word is a unit for decoding an address. The ADIP word is composed of 83 ADIP units. In the 2nd, 4th, 6th, and 8th ADIP units from a top of the ADIP word, the sync 0/1/2/3 units are arranged to indicate the synchronizing signal of the ADIP word. The data units 0/1 indicating the address are arranged in the 10th ADIP unit and thereafter. The error detection and correction for the address is also performed by a unit of an ADIP word.

An RUB (Recording Unit Block) is a minimum unit for recording address data on a disk, and is composed of 3 ADIP words.

Referring now to FIG. 2, the data format of the BD will be described. As the data format of the BD, three kinds of units called a frame, an AUN (Address Unit Number), and a cluster are specified.

As shown in FIG. 2, the frame is composed of 28 wobbles, and a synchronizing signal (hereinafter called frame sync) is arranged at each top of each frame.

The AUN is a unit of decoding a data address. The AUN is composed of 31 frames. A frame sync in a top of the AUN (hereinafter called frame sync 0) has a sync pattern capable of discriminating a break between AUNs.

The cluster is a unit of decoding data. The cluster is composed of 16 AUNs.

The recorded data is generated by combining Run-in (40 wobbles)/Run-out (16 wobbles) with top and bottom of the cluster respectively. The Run-in/Run-out are data patterns for drawing a data system PLL in at a high speed, and data reproducing becomes possible even immediately after the area is moved from an unrecorded area to a recording area. As will be clear from FIG. 2, a relation of 3 ADIP words≈16 AUNs is established.

As shown in FIG. 3, a basis position of the recording start/end of the data is specified in the BD. The top of the ADIP word 0 is set as a recording basis position. However, if the data on the optical disk is repeatedly rewritten in this basis position, the disk may be deteriorated in a position for binding data (hereinafter called linking). In order to prevent it, a method of randomly shifting the linking position (hereinafter called random shift) is employed in the BD. More specifically, as schematically shown in FIG. 3, the position where the data is to be written is shifted in a range of about from −2.35 wobble to +2.33 wobble from the basis position.

When the position on the optical disk is detected based on the ADIP stored in the optical disk by a method of modulating the wobbles meandering along with the data track as described in the aforementioned (1) (hereinafter may be called when detecting the position by an ADIP basis), as the basis position is set to the top of the ADIP word 0, the basis position may be detected with high accuracy. However, in order to detect the position on the optical disk, it is at least required to decode the ADIP address from the ADIP word after establishing the synchronization of the ADIP word and the ADIP unit. As such a process time is required, the time of detecting the position on the optical disk increases.

On the other hand, when the position on the optical disk is detected based on the address information written in the optical disk by the method of writing the address information in the data track as described in the aforementioned (2) (hereinafter may be called when detecting the position by data basis), the position on the optical disk can be detected in a shorter time than in the former technique. However, the deviation amount of the data with respect to the basis position is uncertain, and therefore, recording data may be rewritten at a position that is widely apart from the basis position unless any correction processing is performed.

When the position is detected by data basis, the address may be decoded with a unit of the AUN which is shorter than the ADIP word (see FIG. 4). Accordingly, when the position is detected by data basis, the address may be detected in a shorter time than the case of detecting the position by ADIP basis. As shown in FIG. 4, the length of each ADIP word corresponds to about 5.3 AUNs (16/3 AUNs). As will be clear from FIG. 4, synchronization is established with a relation of 3 ADIP words≈16 AUNs.

Based on the aforementioned description, the exemplary embodiment of the present invention will be described in detail.

FIG. 5 shows an address detection circuit 108. As shown in FIG. 5, the address detection circuit 108 includes a data address detector 51, a data synchronizing signal generator 52, an ADIP address detector 53, an ADIP synchronizing signal generator 54, a correction signal generator 55, a selector (correction signal selector) 56, a data address hold circuit (first data address hold circuit) 57, a timing corrector 58, a data timing generator 59, and an ADIP address hold circuit 60.

The data address detector 51 and the data synchronizing signal generator 52 form a data basis detector 511 that generates a data synchronizing signal and a data address (address information) based on the data signal read out from the data track. The ADIP address detector 53 and the ADIP synchronizing signal generator 54 form an ADIP basis detector 533 that generates an ADIP synchronizing signal and an ADIP address (address information) based on the ADIP signal read out from the wobble.

The timing corrector 58 includes a preset/carry controller (controller) 581, and a counter (second data address hold circuit) 582.

The correction signal generator 55 includes an ADIP unit synchronization sequencer (judgment unit) 551, an ADIP word synchronization sequencer (judgment unit) 552, and an ADIP address synchronization sequencer (judgment unit) 553. These circuits may be referred as sequencers 551, 552, and 553 for the sake of explanation.

The correction signal generator 55 further includes an ADIP unit timing generator (timing correction signal generation unit) 554, an ADIP word timing generator (timing signal generation unit) 555, and an ADIP address timing generator 557. These circuits may be simply called timing generators 554, 555, and 557 hereinafter. The correction signal generator 55 further includes a converter 558. The timing generator 557 and the converter 558 form a timing correction signal generator (timing correction signal generation unit) 556.

The ADIP signal and a CL2 from a wobble circuit 106 are supplied to the address detection circuit 108 (see FIG. 13). Further, a data reproduction signal and a CL1 from an RF circuit 107 are supplied to the address detection circuit 108.

The address detection circuit 108 obtains the ADIP basis address based on the ADIP signal. Further, the address detection circuit 108 obtains the data basis address based on the data reproduction signal. As will be clear from the description below, in the exemplary embodiment, the output timing of the data address is adjusted by any one of a plurality of timing correction signals each having different cycles generated based on the ADIP signal. As such, it is possible to realize address acquiring in a short time, and to present admissibility against the deviation of the data from the basis position.

The wobble signal is supplied to the wobble circuit 106 from an optical head 104 (see FIG. 13). The wobble circuit 106 sequentially executes A/D (Analog/Digital) conversion and decoding on the wobble signals input from the optical head 104. The ADIP signal is generated by the processing in the wobble circuit 106. As stated above, the ADIP (Address In Pre-groove) is address information stored in a disk 101 by wobble modulation.

The CL2 is a clock that is synchronized with the wobble signal. The clock CL2 is supplied to the address generator 108 from the wobble circuit 106. The wobble circuit 106 includes a PLL (Phase Lock Loop) that receives the wobble signal from the optical head 104 as an input signal. The wobble circuit 106 generates the wobble reference clock CL2 in accordance with any arbitrary double speed by the PLL.

The data reproduction signal is a digital signal obtained by A/D converting the RF signal read out by the optical head 104. The RF signal is supplied to the RF circuit 107 from the optical head 104. The RF circuit 107 executes A/D conversion processing on the RF signal. A data reproduction signal in accordance with the RF signal is generated by the processing by the RF circuit 107.

The CL1 is a clock synchronized with the RF signal. The RF circuit 107 includes a PLL that receives the RF signal from the optical head 104 as an input signal. The RF circuit 107 generates the RF reference clock CL1 in accordance with any arbitrary double speed by the PLL.

Hereinafter, functional blocks included in the address detection circuit 108 shown in FIG. 5 will be described. Note that the address detection circuit 108 is formed of a functional circuit embedded in an LSI chip or the like. A part of or all of the address detection circuit 108 may be implemented by software.

First, connection relations between the functional blocks included in the address detection circuit 108 will be described.

An output of the data address detector 51 is connected to the data address hold circuit 57. An output of the data address hold circuit 57 is connected to the preset/carry controller 581. An output of the preset/carry controller 581 is connected to the counter 582.

An output of the data address detector 51 is connected to the data synchronizing signal generator 52. An output of the data synchronizing signal generator 52 is connected to the data timing generator 59. An output of the data timing generator 59 is connected to the data address hold circuit 57. Further, an output of the data timing generator 59 is connected to the preset/carry controller 581.

An output of the ADIP address detector 53 is connected to the ADIP address hold circuit 60, the ADIP address timing generator 557, and the ADIP address synchronization sequencer 553.

An output of the ADIP address detector 53 is also connected to the ADIP synchronizing signal generator 54. An output of the ADIP synchronizing signal generator 54 is connected to the ADIP unit synchronization sequencer 551. Further, an output of the ADIP synchronizing signal generator 54 is connected to the ADIP word synchronization sequencer 552.

An output of the ADIP unit synchronization sequencer 551 is connected to the ADIP unit timing generator 554. An output of the ADIP unit timing generator 554 is connected to the selector 56.

An output of the ADIP word synchronization sequencer 552 is connected to the ADIP word timing generator 555. An output of the ADIP word timing generator 555 is connected to the ADIP address hold circuit 60.

An output of the ADIP address synchronization sequencer 553 is connected to the ADIP address timing generator 557. An output of the ADIP address timing generator 557 is connected to the converter 558. An output of the converter 558 is connected to the selector 56. Further, an output of the ADIP address synchronization sequencer 553 is connected to the selector 56. An output of the selector 56 is connected to the preset/carry controller 581.

An output of the ADIP unit synchronization sequencer 551 is connected to the ADIP word synchronization sequencer 552. An output of the ADIP word synchronization sequencer 552 is connected to the ADIP address synchronization sequencer 553.

An output of the ADIP unit timing generator 554 is connected to the ADIP word timing generator 555. An output of the ADIP word timing generator 555 is connected to the ADIP address timing generator 557.

As shown in FIG. 5, the data synchronizing signal generator 52 and the data timing generator 59 are operated in accordance with the clock CL1. The ADIP synchronizing signal generator 54, the sequencers 551 to 553, the timing generators 554 to 557, the converter 558, the selector 56, the data address hold circuit 57, the timing corrector 58, and the ADIP address hold circuit 60 are operated in accordance with the clock CL2.

Next, functions of the functional blocks included in the address detection circuit 108 will be described.

The data address detector 51 detects the data address from the data reproduction signal, and outputs the detected data address to the data address hold circuit 57. More specifically, the data address detector 51 detects an address bit, and executes decoding of the address based on the address bit that is detected and error detection/correction.

The data synchronizing signal generator 52 generates a frame synchronizing signal that is synchronized with the frame which is a data format unit based on the data reproduction signal that is output from the data address detector 51. More specifically, the data synchronizing signal generator 52 generates the synchronizing signal of a frame unit based on the identification of frame sync included in the frame.

The ADIP address detector 53 detects the ADIP data address based on the ADIP signal and outputs the detected address to the ADIP address hold circuit 60. To be more specific, the ADIP address detector 53 detects the address bit, and executes decoding of the address based on the address bit that is detected and the error detection/correction.

The ADIP synchronizing signal generator 54 generates the ADIP unit synchronizing signal of the ADIP unit cycle which is the ADIP format unit based on the ADIP data address output from the ADIP address detector 53. The ADIP synchronizing signal generator 54 outputs the generated ADIP unit synchronizing signal to the ADIP unit synchronization sequencer 551.

Further, the ADIP synchronizing signal generator 54 generates the ADIP word synchronizing signal of the ADIP word cycle which is the ADIP format unit based on the ADIP data address output from the ADIP address detector 53. The ADIP synchronizing signal generator 54 outputs the generated ADIP word synchronizing signal to the ADIP word synchronization sequencer 552.

The ADIP unit synchronization sequencer 551 monitors whether the cycle of the ADIP unit synchronizing signal is a certain cycle (56-wobble cycle). A state transition of the ADIP unit synchronization sequencer 551 will be explained with reference to FIG. 6.

As shown in FIG. 6, the ADIP unit synchronization sequencer 551 transits through three states of a backward protection state (S000), a synchronized state (S001), and a forward protection state (S002).

The sequencer 551 is in the backward protection state (S000) at an initial state. The sequencer 551 transits to the synchronized state (S001) when an ADIP unit synchronizing signal (hereinafter may be simply called synchronizing signal S1) is consecutively or accumulatively detected in a constant cycle (56-wobble cycle). When the synchronizing signal S1 cannot be consecutively or accumulatively detected in the 56-wobble cycle, the sequencer 551 remains in the backward protection state (S000). The synchronization has not been established in the backward protection state (S000).

The sequencer 551 monitors whether the detection of the synchronizing signal S1 in the 56-wobble cycle is maintained in the synchronized state (S001). When the synchronizing signal S1 can be detected in the 56-wobble cycle (in the synchronized state), the sequencer 551 remains in the synchronized state (S001). The sequencer 551 transits to the forward protection state (S002) when detecting the synchronizing signal S1 even just once when the cycle is out of the 56-wobble cycle.

The sequencer 551 checks whether the detection timing of the synchronizing signal S1 is completely out of the 56-wobble cycle in the forward protection state (S002). More specifically, the sequencer 551 checks whether the synchronizing signal S1 can be detected again in the 56-wobble cycle. When the synchronizing signal S1 is detected even just once in the 56-wobble cycle, the sequencer 551 reverts back to the synchronized state (S001). When the synchronizing signal S1 cannot be detected either consecutively or accumulatively in the 56-wobble cycle, the sequencer 551 transits to the backward protection state (S000).

The sequencer 551 sets a lock signal S3 from an L level to an H level in the synchronized state (S001) and the forward protection state (S002). By setting the lock signal S3 to the H level, it is possible to notify the ADIP word synchronization sequencer 552 that the synchronization is established in the ADIP unit level. In this description, it is assumed that the synchronization is also established in the forward protection state (S002).

When transiting from the backward protection state (S000) to the synchronized state (S001), the sequencer 551 outputs a preset signal S4 to the ADIP unit timing generator 554. The timing generator 554 starts self-running by the preset signal S4 as a trigger. As will be described later, the timing generator 554 is a circuit that generates a timing signal in the 56-wobble cycle (ADIP unit cycle). The timing generator 554 takes an initial value with the preset signal S4, and thereafter, counts the number of clocks of the clock CL2 for self-running.

The ADIP word synchronization sequencer 552 monitors whether the cycle of the ADIP word synchronizing signal is a certain cycle (83-ADIP-unit cycle). The state transition of the ADIP word synchronization sequencer 552 will be described with reference to FIG. 7.

As shown in FIG. 7, the ADIP word synchronization sequencer 552 transits through four states of an initial state (S010), a backward protection state (S011), a synchronized state (S012), and a forward protection state (S013).

The sequencer 552 waits until when the sequencer 551 transits from the backward protection state (S000) to the synchronized state (S001) in the initial state. When the lock signal S3 is changed from the L level to the H level, the sequencer 552 transits from the initial state (S010) to the backward protection state (S011). When the lock signal S3 is in the L level, the sequencer 552 remains in the initial state (S010).

The sequencer 552 monitors whether an ADIP word synchronizing signal S7 (hereinafter may be simply called synchronizing signal S7) can be detected consecutively or accumulatively in a certain cycle (83 ADIP units) in the backward protection state (S011). When the synchronizing signal S7 can be detected consecutively or accumulatively in the 83-ADIP-unit cycle, the sequencer 552 transits to the synchronized state (S012). When the synchronizing signal S7 cannot be detected consecutively or accumulatively in the 83-ADIP-unit cycle, the sequencer 552 remains in the backward protection state (S011).

The sequencer 552 monitors whether the detection of the synchronizing signal S7 in the 83-ADIP-unit cycle can be maintained in the synchronized state (S012). When the synchronizing signal S7 is detected in the 83-ADIP-unit cycle (in the synchronized state), the sequencer 552 remains in the synchronized state (S012). If the synchronizing signal S7 is detected even just once at a timing that is deviated from the 83-ADIP-unit cycle, then the sequencer 552 transits to the forward protection state (S013).

The sequencer 552 checks whether the detection timing of the synchronizing signal S7 is completely deviated from the 83-ADIP-unit cycle in the forward protection state (S013). More specifically, the sequencer 552 checks whether the synchronizing signal S7 may be detected again in the 83-ADIP-unit cycle. When the synchronizing signal S7 is detected even just once in the 83-ADIP-unit cycle, the sequencer 552 reverts back to the synchronized state (S012). When the synchronizing signal S7 cannot be detected consecutively or accumulatively in the 83-ADIP-unit cycle, the sequencer 552 transits to the initial state (S010).

The sequencer 552 transits to the initial state (S010) in any state when the lock signal S3 is in the L level, and remains in the initial state (S010) until when the lock signal S3 is changed from the L level to the H level.

The sequencer 552 changes a lock signal S9 from the L level to the H level in the synchronized state (S012) or the forward protection state (S013). By setting the lock signal S9 to the H level, it is possible to notify the ADIP address synchronization sequencer 553 that the synchronization is established in the ADIP word level. In this description, it is assumed that the synchronization is established also in the forward protection state (S013).

The sequencer 552 outputs a preset signal S10 to the ADIP word timing generator 555 when it transits from the backward protection state (S011) to the synchronized state (S012). The timing generator 555 starts self-running based on the preset signal S10. As will be described, the timing generator 555 is a circuit that generates the timing signal in the 83 ADIP cycles (ADIP word cycle). The timing generator 555 takes an initial value with the preset signal S10, and thereafter, counts the number of clocks of the clock CL2, and performs self-running based on the carry signal from the timing generator 554.

The ADIP address synchronization sequencer 553 checks the reliability of the ADIP address output from the ADIP address detector 53, and when the reliability is ensured, it outputs a preset signal S15 to the ADIP address timing generator 557. Referring now to FIG. 8, the state transition of the ADIP address synchronization sequencer 553 will be described.

As shown in FIG. 8, the ADIP address synchronization sequencer 553 transits through three states of an initial state (S020), an address judging state (S021), and a synchronized state (S022).

The sequencer 553 waits until when the sequencer 552 transits to the synchronized state (S012) in the initial state (S020). The sequencer 553 transits to the address judging state (S021) when the lock signal S9 is changed from the L level to the H level. The sequencer 553 remains in the initial state (S020) when the lock signal S9 is in the L level.

The sequencer 553 judges whether the address values of an ADIP address S12 that are temporally successively input are continuous in the address judging state (S021). For example, the sequencer 553 compares an address value at this point and a previous address value, so as to determine whether the address values are different by a predetermined value (1, for example). When there is a continuity in the address values, the sequencer 553 transits to the synchronized state (S022). When there is no continuity in the address values, the sequencer 553 remains in the address judging state (S021). By checking the continuity of the address values, timing generation based on the discontinuous ADIP address can be prevented.

The sequencer 553 outputs the preset signal S15 to the ADIP address timing generator 557 in the synchronized state (S022). The timing generator 557 receives the address value of the ADIP address that is output from the ADIP address detector 53 in accordance with the preset signal S15 and outputs this address value to the converter 558.

The sequencer 553 transits to the initial state (S020) in any state when the lock signal S9 is in the L level, and remains in the initial state (S020) until when the lock signal S9 is changed from the L level to the H level.

The sequencer 553 changes a lock signal S14 from the L level to the H level in the synchronized state (S022). By setting the lock signal S14 to the H level, it is possible to notify the selector 56 that the synchronization is established in the ADIP address level.

The ADIP unit timing generator 554 generates the timing of the ADIP unit cycle. The timing generator 554 includes a counter that counts 0 to 55 as one cycle. One cycle of the counter is set in accordance with 1 ADIP unit (56 wobbles). The timing generator 554 increments the count value by one in accordance with the count (+1) of the pulse of the clock CL2. The timing generator 554 outputs a timing correction pulse when the count value is equal to zero. The timing generator 554 outputs the carry signal to the ADIP word timing generator 555 when the count value of the counter is changed from 55 to 0. Similarly, the timing generator 554 outputs the timing correction signal to the selector 56.

Alternatively, the timing correction pulse may be output from the timing generator 554 in a cycle longer than the cycle of the ADIP unit. As such, a range of absorbing the deviation of the recorded data can be increased. In short, it is possible to present admissibility for the deviation of data against the basis position.

The ADIP word timing generator 555 generates the timing in the ADIP word cycle (83-ADIP-unit cycle). The timing generator 555 includes a counter that counts 0 to 82 as one cycle. One cycle of the counter is set in accordance with the 1 ADIP word (83 ADIP units). The timing generator 555 increments the count value by one in accordance with the count (+1) of the pulse of the clock CL2. Further, the timing generator 555 increments the count value by one in accordance with the count (+1) of the carry signal from the ADIP unit timing generator 554. The timing generator 555 generates and outputs a timing signal S8 in accordance with the count value of the counter. The timing generator 555 outputs the carry signal to the ADIP address timing generator 557 when the count value of the counter is changed from 82 to 0.

The ADIP address timing generator 557 includes a counter, holds the address value of the ADIP address, and outputs this value. The timing generator 557 receives the address value of the ADIP address output from the ADIP address detector 53 in accordance with the preset signal S15. Thereafter, the timing generator 557 increments the address value that is held by one in accordance with the count (+1) of the pulse of the clock CL2. Further, the timing generator 557 increments the address value that is held by one in accordance with the carry signal output from the ADIP word timing generator 555.

The converter 558 generates a timing correction signal S17 of the AUN cycle based on the ADIP address output from the ADIP address timing generator 557. As shown in FIG. 4, the ADIP words and the AUNs are associated with each other. The converter 558 decodes the ADIP address, specifies the offset number of the ADIP word, and calculates the timing of the AUN based on the correspondence relation of FIG. 4. Then, the converter 558 outputs the timing correction signal S17 of the AUN cycle.

Note that the timing correction pulse may be output from the converter 558 in a cycle (N (N: natural number)×AUN cycle) that is longer than the AUN cycle. As such, it is possible to increase the range of absorbing the deviation of the recorded data. In short, it is possible to present admissibility for the deviation of data against the basis position.

The selector 56 selects a timing correction signal S6 or the timing correction signal S17 based on the lock signal S14, and outputs the selected signal to the preset/carry controller 581 as a timing correction signal S19.

The selector 56 selects and outputs the timing correction signal S6 when the lock signal S14 is in the L level. The selector 56 selects and outputs the timing correction signal S17 when the lock signal S14 is in the H level. As stated above, the lock signal S14 is set to the H level when the ADIP address synchronization sequencer 553 is in the synchronized state (S022). The lock signal S14 becomes H level for the first time when the continuity of the ADIP address is ensured.

In this exemplary embodiment, the timing correction signal S6 of short cycle is selected first, and thereafter, the timing correction signal S17 of long cycle is selected. Accordingly, the range of absorbing the deviation of the recorded data can be increased. That is, it is possible to present admissibility for the deviation of data against the basis position.

The data timing generator 59 generates a timing signal S20 of the AUN cycle based on the frame synchronizing signal, and outputs this signal to the data address hold circuit 57. The data timing generator 59 changes a final frame signal S22 from the L level to the H level when the final frame of the data written in the dick 101 is detected based on the frame synchronizing signal, and outputs the signal to the preset/carry controller 581.

The data address hold circuit 57 latches a data address S18 output from the data address detector 51 based on the timing signal S20 output from the data timing generator 59.

The preset/carry controller 581 presets the data address held by the data address hold circuit 57 in the counter 582 when the timing correction signal S19 is in the H level.

The preset/carry controller 581 forcibly increments the counter 582 when the final frame signal S22 of the H level is input. In other words, when the final frame signal S22 is input, the preset/carry controller 581 does not preset the data address held in the data address hold circuit 57 in the counter 582 even when the timing correction signal S19 is in the H level. There is occurred a decode delay from when the data is read out from the disk 101 to when the address value of the data address hold circuit 57 is updated. By incrementing the counter 582 prior to the updating of the value held in the data address hold circuit 57, the influence of the decode delay can be prevented.

The counter 582 outputs the address value in accordance with the control by the preset/carry controller 581.

The ADIP address hold circuit 60 latches the ADIP address output from the ADIP address detector 53 based on the timing signal S8 output from the ADIP word timing generator 555.

Referring next to FIGS. 9 to 12, the operation of the address detection circuit 108 will be described.

Figure 9:
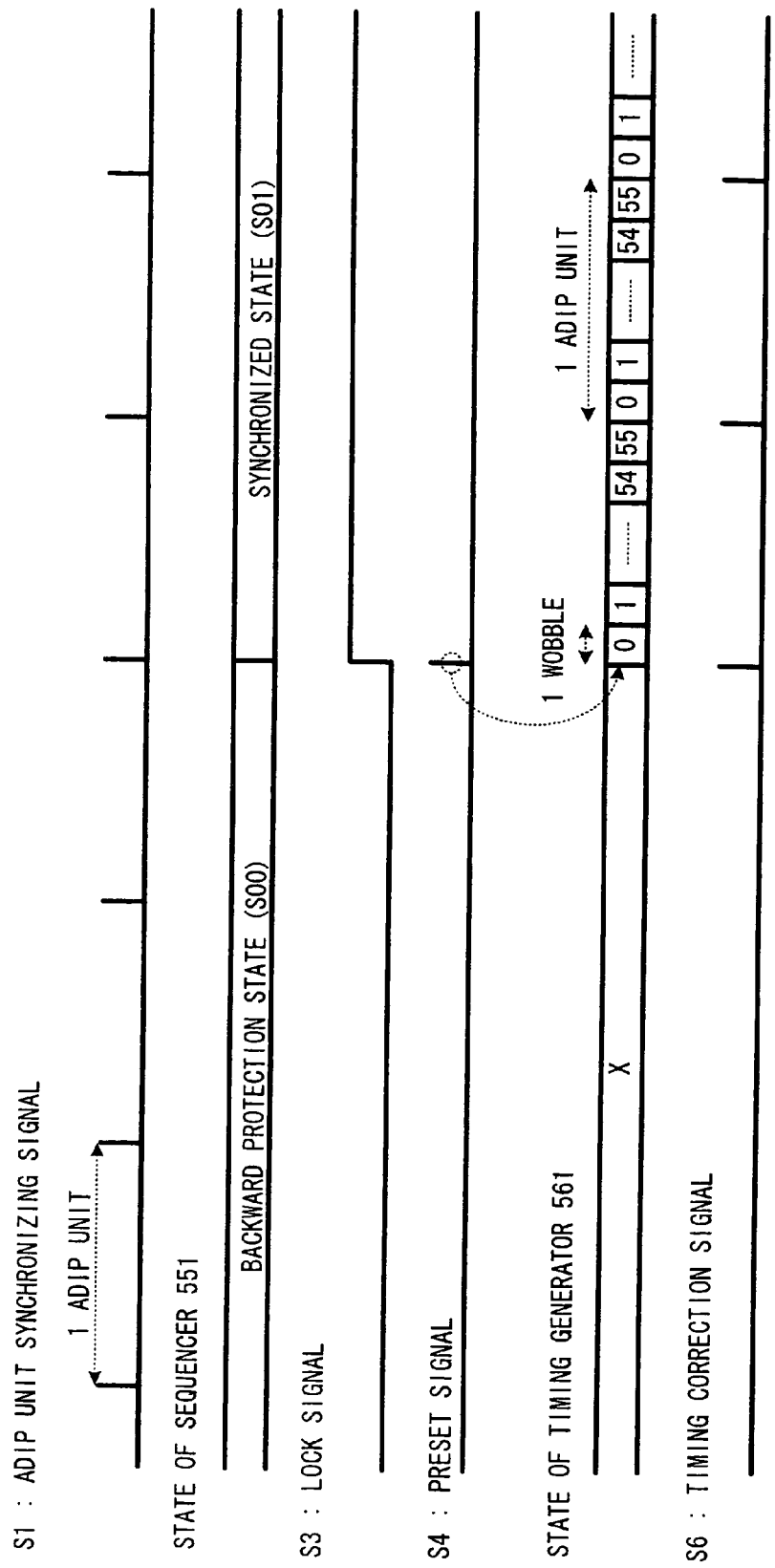
FIG. 9 is a timing chart for describing the operation of the address detection circuit according to the first exemplary embodiment of the present invention.

Description will be made first with reference to a timing chart shown in FIG. 9.

First, the ADIP address detector 53 detects the ADIP data address based on the ADIP signal, and outputs the detected address to the ADIP address hold circuit 60. Further, the ADIP synchronizing signal generator 54 generates the ADIP unit synchronizing signal S1 based on the received ADIP signal. As shown in FIG. 9, the ADIP unit synchronizing signal S1 is output from the ADIP synchronizing signal generator 54 for every 1 ADIP unit.

The ADIP unit synchronization sequencer 551 is in the backward protection state (S000) in the first state. As shown in FIG. 9, the ADIP unit synchronization sequencer 551 transits to the synchronized state (S001) when consecutively detecting the synchronizing signal S1 in a certain cycle. Then, the sequencer 551 sets the lock signal S3 to the H level as shown in FIG. 9. Further, the sequencer 551 monitors whether the synchronizing signal S1 is detected in the 56-wobble cycle. Furthermore, as shown in FIG. 9, the sequencer 551 outputs the preset signal S4 to the ADIP unit timing generator 554. Then, as shown in FIG. 9, the timing generator 554 starts the count operation in a one-wobble cycle based on the clock CL2. The timing generator 554 outputs the timing correction signal S6 at a timing where the count value is equal to zero.

As the lock signal S14 is in the L level, the selector 56 outputs the timing correction signal S6 as the timing correction signal S19. The timing correction signal S6 is generated from when the sequencer 551 transits from the backward protection state (S000) to the synchronized state (S001). Accordingly, the timing correction signal for correcting the time point of acquiring the data address can be generated in a relatively short period. At this time, the other timing correction signal S17 is not connected to the selector 56.

The sequencer 551 transits to the forward protection state (S002) when the synchronizing signal S1 cannot be detected in the 56-wobble cycle. The sequencer 551 transits to the backward protection state (S000) when the synchronizing signal S1 cannot be detected in the 56-wobble cycle. When the state transits from the forward protection state to the backward protection state, the sequencer 551 changes the lock signal S3 from the H level to the L level. As such, the sequencer 552 is forcibly set to the initial state (S010).

Figure 10:
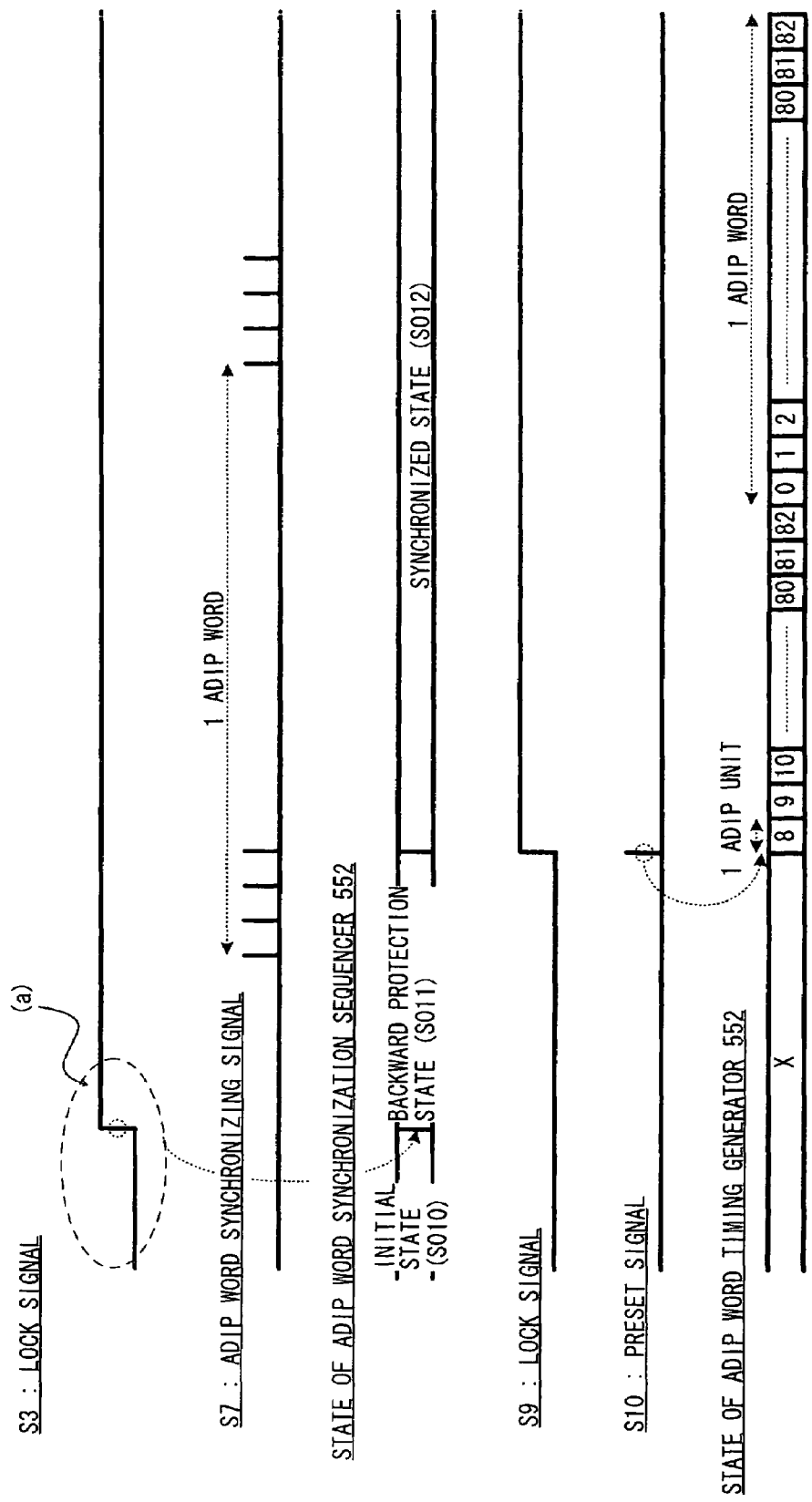
FIG. 10 is a timing chart for describing the operation of the address detection circuit according to the first exemplary embodiment of the present invention.

Referring next to FIG. 10, the operation of the address detection circuit 108 will be described further in detail. FIG. 9 is a diagram in which a dotted line part shown in (a) of FIG. 10 is enlarged.

As shown in FIG. 10, when the lock signal S3 is set to the H level, the sequencer 552 transits from the initial state (S010) to the backward protection state (S011). The sequencer 552 monitors whether the synchronizing signal S7 can be detected in the 83-ADIP-unit cycle. The synchronizing signal S7 is generated by the operation of the ADIP address detector 53 and the ADIP synchronizing signal generator 54, and is connected to the sequencer 552.

The sequencer 552 transits from the backward protection state (S011) to the synchronized state (S012) when the synchronizing signal S7 can be consecutively detected in the 83-ADIP-unit cycle. Then, the sequencer 552 outputs the lock signal S9 to the sequencer 553. Further, the sequencer 552 outputs the preset signal S10 to the ADIP word timing generator 555. The ADIP word timing generator 555 starts the count operation based on the clock CL2 from the value that is set as an initial value in advance in accordance with the preset signal S10. The timing generator 555 generates and outputs the timing signal S8 in accordance with the count value of the counter.

Note that the sequencer 552 transits to the forward protection state (S013) when the synchronizing signal S7 cannot be detected in the 83-ADIP-unit cycle. The sequencer 552 transits to the initial state (S010) when the synchronizing signal S7 cannot be detected again in the 83-ADIP-unit cycle. When the state transits from the forward protection state (S013) to the initial state (S010), the sequencer 552 changes the lock signal S9 from the H level to the L level. Thus, the sequencer 553 is forcibly set to the initial state (S020).

Figure 11:
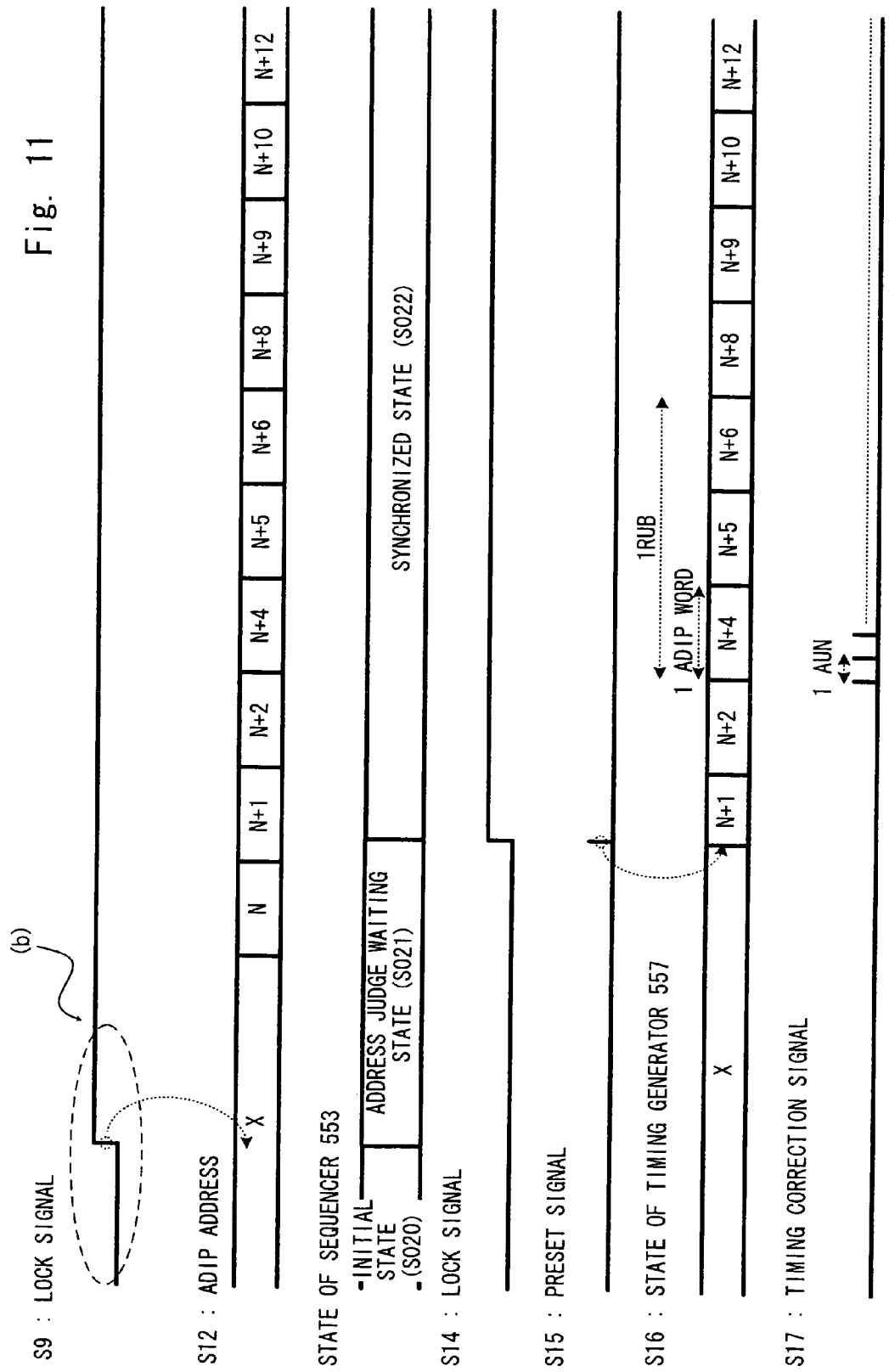
FIG. 11 is a timing chart for describing the operation of the address detection circuit according to the first exemplary embodiment of the present invention.

Referring now to FIG. 11, the operation of the address detection circuit 108 will further be described. Note that FIG. 10 is a diagram where a dotted line part shown in (b) of FIG. 11 is enlarged.

When the lock signal S9 becomes the H level, the sequencer 553 transits from the initial state (S020) to the address judging state (S021). The sequencer 553 determines whether the address values of the ADIP address S12 that are temporally successively input are continuous. When it is ensured that the address values are continuous, the sequencer 553 transits from the address judging state (S021) to the synchronized state (S022). Then, the sequencer 553 outputs the lock signal S14 of the H level to the selector 56. Further, the sequencer 553 outputs the preset signal S15 to the timing generator 557. The timing generator 557 receives the address value of the ADIP address from the ADIP address detector 53 in accordance with the preset signal S15. Thereafter, the timing generator 557 executes address addition according to the carry signal. The converter 558 generates the timing correction signal S17 of the AUN cycle based on the ADIP address output from the ADIP address timing generator 557.

The selector 56 outputs the timing correction signal S17 as the timing correction signal S19 with some delay after the lock signal S14 turns to the H level.

The preset/carry controller 581 presets the data address held in the data address hold circuit 57 in the counter 582 when the timing correction signal S19 is in the H level. However, when the final frame signal S22 of the H level is input, the preset/carry controller 581 forcibly increments the counter 582. There is occurred a decode delay from when the data is read out from the disk 101 to when the address value of the data address hold circuit 57 is updated. The influence of the decode delay can be prevented by incrementing the counter 582 prior to the update of the value held in the data address hold circuit 57.

Note that the sequencer 553 remains in the address judging state when the continuity of the address values cannot be ensured. Further, the sequencer 553 transits to the initial state (S020) in any state when the lock signal S9 turns to the L level.

Figure 12:
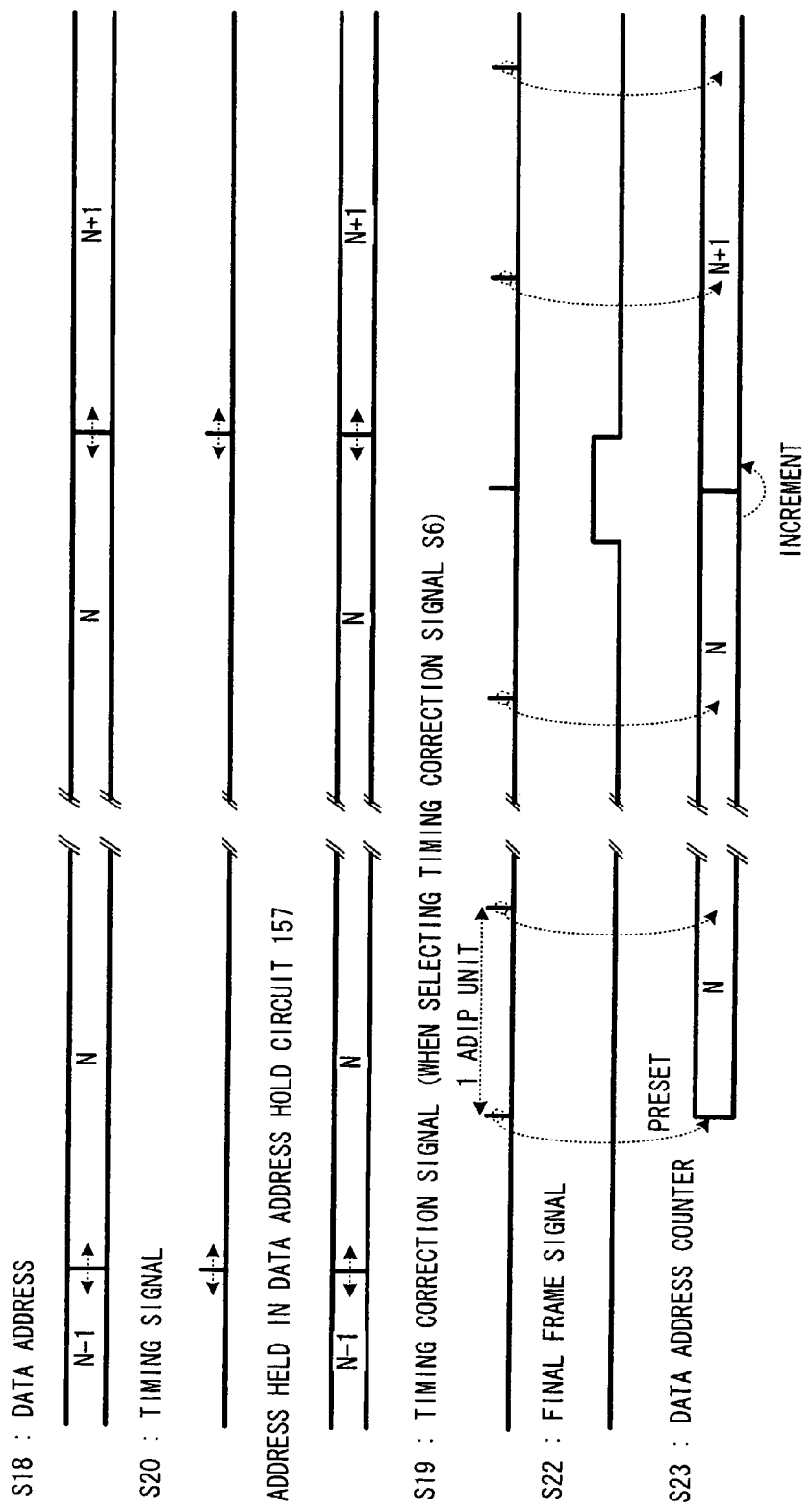
FIG. 12 is a timing chart for describing the operation of the address detection circuit according to the first exemplary embodiment of the present invention.
Figure 13:
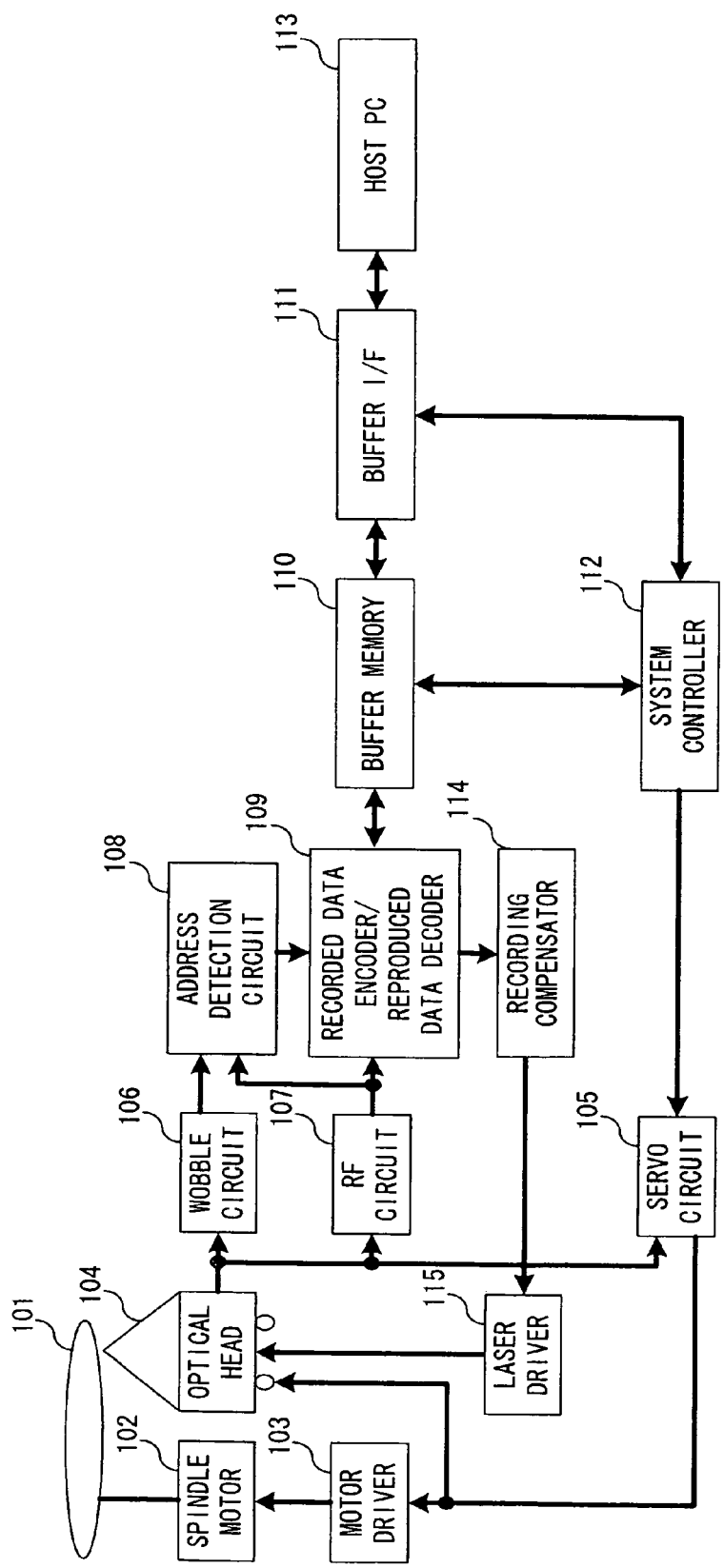
FIG. 13 is a block diagram showing the schematic configuration of an optical pickup device according to the first exemplary embodiment of the present invention.

Referring to FIG. 12, the operation of the address detection circuit 108 will be described.

As shown in FIG. 12, the time points of acquiring the data address S18 and the timing signal S20 vary. Accordingly, the address is set in the data address hold circuit 57 with temporal variation. When the address is detected based on the data address set in the data address hold circuit 57, the data storing quality of the optical disk may be degraded due to the fluctuation of the timing of acquiring the address.

In the first exemplary embodiment, as shown in FIG. 12, the selector 56 selects and outputs the timing correction signal S6 generated based on the ADIP signal as the timing correction signal S19. By adjusting the output timing of the data address with the timing correction signal S19, the timing of acquiring the address can be accorded with the basis position on the optical disk.

As shown in FIG. 12, when the data timing generator 59 detects the final frame, the final frame signal S22 is output to the preset/carry controller 581. The preset/carry controller 581 forcibly increments the counter 582 upon detection of the final frame signal S22. By incrementing the counter 582 prior to the update of the value held in the data address hold circuit 57, the influence of the decode delay can be prevented.

As will be clear from the aforementioned description, data basis address detection is also executed in addition to ADIP basis address detection for the purpose of reducing the period required for acquiring the address. At this time, the output timing of the data address is adjusted based on the timing correction signal generated based on the ADIP signal. Thus, the address can be obtained in accordance with the basis position on the optical disk.

When detecting the address by ADIP basis, it may be difficult to detect the accurate address acquiring timing due to the distortion or the like of the wobble signal that is read out from the wobble. When detecting the address by data basis, the address and the timing are detected from the data signal that is read out from the data track, thereby hardly being influenced by the quality of the wobble signal.

Furthermore, according to the exemplary embodiment, in order to detect the address in accordance with the basis position on the optical disk, the output timing of the data address is adjusted by one of two timing correction signals whose cycles are different from each other (timing correction signal S6 of ADIP unit cycle, timing correction signal S17 of AUN cycle). The output timing of the data address is firstly adjusted by the timing correction signal S6 of short cycle, and then the output timing of the data address is adjusted by the timing correction signal S17 of long cycle. Accordingly, the range of absorbing the deviation of the recorded data can be increased. In summary, it is possible to present admissibility for the deviation of data against the basis position.

Further, in order to increase the reliability of the timing correction signal, the state of the synchronizing signal or the ADIP address is determined by the sequencers 551 and 552, and thereafter the timing correction signal or the timing signal is generated by the timing generators 554, 555, and 556. Accordingly, it is possible to effectively suppress the occurrence of the error at the timing of acquiring the address due to the error.

Lastly, with reference to FIG. 13, a schematic block configuration of the optical disk device in which the address detection circuit 108 is embedded will be described. Note that the specific configuration of the optical disk may be any configuration. Further, as the specific configuration of the optical disk is obvious to a person skilled in the art, the detailed description thereof will be omitted.

A spindle motor 102 and a motor driver 103 control rotation of the optical disk 101. An optical head 104 irradiates a laser beam on the optical disk 101 or receives a reflected beam, so as to execute recording/reproducing control. A servo circuit 105 performs focusing/tracking control of the optical head 104 or the rotation speed control of the spindle motor 102. A wobble circuit 106 A/D converts or binarizes the wobble signal input from the optical head 104, and generates a wobble reference channel clock according to the double speed by the PLL. Further, the wobble circuit 106 detects the MSK modulator by detection of the wobble signal, and generates the address information and the synchronizing signal of the ADIP. An RF circuit 107 A/D converts or binarizes the RF signal input from the optical head 104, and generates the RF reference channel clock in accordance with the double speed by the PLL. Further, the RF circuit 107 generates the address information and the synchronizing signal included in the RF. The address detection circuit 108 receives the address information, the synchronizing signal, and the channel clock from the wobble circuit 106 or the RF circuit 107, so as to establish synchronization and generate the address. A recorded data encoder/reproduced data decoder 109 encodes the recorded data held in a buffer memory 110 or decodes the reproduced data output from the RF circuit 107. The buffer memory 110 stores the recorded data before being encoded that is received from a host PC 113 or the reproduced data decoded by the reproduced data decoder 109. A system controller 112 executes communication control between the buffer memory 110 and the host PC 113 through a buffer I/F 111. A recording compensator 114 controls a laser pulse based on the recorded data encoded by the recorded data encoder 109, and makes an adjustment to perform recording in an optimal laser power.

The technical scope of the present invention should not be limited to the aforementioned exemplary embodiment. The present invention may also be applied to other optical disks than the BD.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An address detection circuit comprising:
   a correction signal generator that generates a plurality of timing correction signals based on an ADIP (Address In Pre-groove) signal that is read out from a wobble of an optical disk, the timing correction signals having different cycles with each other;
   a correction signal selector that selects one of the timing correction signals generated by the correction signal generator and outputs the selected signal; and
   a timing corrector that outputs a data address detected based on a data signal that is read out from a data track of the optical disk at a timing in accordance with the timing correction signal transmitted from the correction signal selector.

2. The address detection circuit according to claim 1, further comprising:
   a first data address hold circuit that holds the data address and outputs the data address to the timing corrector at a timing in accordance with a data synchronizing signal generated from the data signal.

3. The address detection circuit according to claim 2, wherein the timing corrector comprises:
   a second data address hold circuit that holds and outputs the data address; and
   a controller that transfers the data address held in the first address hold circuit to the second data address hold circuit at a timing in accordance with the timing correction signal transmitted from the correction signal selector.

4. The address detection circuit according to claim 2, further comprising:
   a data address detector that detects the data address from the data signal; and
   a data synchronizing signal generator that generates the data synchronizing signal from the data signal.

5. The address detection circuit according to claim 1, wherein the correction signal generator comprises:
   a plurality of judgment units that judge whether each cycle of ADIP synchronizing signals, which are detected from the ADIP signal, is a certain cycle; and
   a plurality of correction signal generation units that generate the timing correction signals in accordance with the judgment results by the judgment units.

6. The address detection circuit according to claim 5, further comprising:
   an ADIP address hold circuit that holds an ADIP address detected from the ADIP signal, wherein
   the correction signal generator also generates a timing signal that determines a timing at which the ADIP address hold circuit receives the ADIP address.

7. The address detection circuit according to claim 6, wherein the correction signal generator comprises:
   a first judgment unit that judges whether a cycle of a first ADIP synchronizing signal generated from the ADIP signal is a predetermined cycle;
   a second judgment unit that judges whether a cycle of a second ADIP synchronizing signal generated from the ADIP signal is a predetermined cycle;
   a third judgment unit that judges continuity of the ADIP address supplied to the ADIP address hold circuit;
   a first correction signal generation unit that generates a first timing correction signal based on the judgment result of the first judgment unit;
   a timing signal generation unit that generates the timing signal based on the judgment result of the second judgment unit; and
   a second correction signal generation unit that receives and holds the ADIP address based on the judgment result of the third judgment unit and generates a second timing correction signal based on the holding ADIP address.

8. The address detection circuit according to claim 6, further comprising:
   an ADIP address detector that detects the ADIP address from the ADIP signal; and
   a second synchronizing signal generator that generates the synchronizing signal from the ADIP signal.

9. An address detection method that detects an address indicating a position on an optical disk, the method comprising:
   generating a plurality of timing correction signals based on an ADIP (Address In Pre-groove) signal that is read out from a wobble of the optical disk, the timing correction signals having different cycles with each other;
   selecting one of the plurality of timing correction signals; and
   outputting a data address that is detected based on a data signal that is read out from a data track of the optical disk at a timing in accordance with the selected timing correction signal.

10. The address detection method according to claim 9, further comprising holding and outputting the data address at a timing in accordance with a data synchronizing signal generated from the data signal.

11. The address detection method according to claim 10, further comprising transferring the data address that is held in a first address hold unit to a second data address hold unit at a timing in accordance with the timing correction signal that is selected.

* * * * *